United States Patent
Kurylko et al.

(10) Patent No.: US 12,039,539 B2
(45) Date of Patent: Jul. 16, 2024

(54) SYSTEM, METHOD, AND DEVICE FOR DETECTING THAT A USER IS INTOXICATED WHEN PROCESSING PAYMENT CARD TRANSACTIONS

(71) Applicant: Mastercard International Incorporated, Purchase, NY (US)

(72) Inventors: Marek Kurylko, Bloomfield, NJ (US); Joseph Hayes, Montclair, NJ (US); Eugene Reda, Little Falls, NJ (US)

(73) Assignee: Mastercard International Incorporated, Purchase, NY (US)

(*) Notice: Subject to any disclaimer, the term of this patent is extended or adjusted under 35 U.S.C. 154(b) by 165 days.

(21) Appl. No.: 16/930,821

(22) Filed: Jul. 16, 2020

(65) Prior Publication Data

US 2022/0020021 A1    Jan. 20, 2022

(51) Int. Cl.
*G06Q 20/40*     (2012.01)
*G06Q 20/42*     (2012.01)

(52) U.S. Cl.
CPC ..... *G06Q 20/405* (2013.01); *G06Q 20/40145* (2013.01); *G06Q 20/4097* (2013.01); *G06Q 20/42* (2013.01)

(58) Field of Classification Search
CPC ........... G06Q 20/405; G06Q 20/40145; G06Q 20/4097; G06Q 20/42; G06Q 20/204;
(Continued)

(56) References Cited

U.S. PATENT DOCUMENTS 3,491,869 A    1/1970 Utz
8,041,344 B1   10/2011 Coughlan et al.
(Continued)

FOREIGN PATENT DOCUMENTS

CA    2320514 A1    3/2002
DE    102015113942 A1 *  2/2016  ........... G06F 16/337
(Continued)

OTHER PUBLICATIONS

Lima, Joao Carlos D., Cristiano C. Rocha, and Iara Augustin. "A context-aware recommendation system to behavioral based authentication in mobile and pervasive environments." In 2011 IFIP 9th International Conference on Embedded and Ubiquitous Computing, pp. 312-319. IEEE, 2011. (Year: 2011).*

(Continued)

*Primary Examiner* — Gregory S Cunningham, II
*Assistant Examiner* — James H Miller
(74) *Attorney, Agent, or Firm* — Ruggiero McAllister & McMahon LLC

(57) ABSTRACT

A method and a system are provided for processing payment card transactions in conjunction with a user device configured to detect intoxicated use. The user device includes a behavior detection application which can detect whether a user is intoxicated using the device's motion sensing hardware, user endpoint data, and application level data. When the user attempts a transaction while intoxicated, the user's device can detect that the user is impaired or sober. If impaired, the payment card system can deny the transaction. If sober, the payment card system can offer incentives for certain transactions. The payment card system can also allow sponsoring entities to pay for transactions that incentivize better behavior when a user is intoxicated or support transactions for sober users.

21 Claims, 9 Drawing Sheets

Enrollment
85

Hardware Permissions
90

Service Tracker in Issuer UI
95

(58) Field of Classification Search
CPC .............. G06Q 20/206; G06Q 20/322; G06Q 20/4016; H04L 67/12
See application file for complete search history.

(56) References Cited

U.S. PATENT DOCUMENTS

| | | | |
|---|---|---|---|
| 8,696,358 | B2 | 4/2014 | Flanagan |
| 9,418,491 | B2 | 8/2016 | Phillips |
| 9,788,772 | B2 | 10/2017 | Nothacker et al. |
| 10,108,703 | B2 | 10/2018 | Barsness et al. |
| 10,210,569 | B1 * | 2/2019 | Kim .................. G06Q 20/0855 |
| 11,157,906 | B1 * | 10/2021 | Smith .................. G06Q 20/405 |
| 2003/0074568 | A1 | 4/2003 | Kinsella et al. |
| 2005/0125363 | A1 | 6/2005 | Wilson et al. |
| 2006/0190419 | A1 | 8/2006 | Bunn et al. |
| 2009/0157515 | A1 | 6/2009 | Lafauci et al. |
| 2014/0052567 | A1 | 2/2014 | Bhardwaj et al. |
| 2014/0109185 | A1 * | 4/2014 | Burke .................. H04L 63/102 726/4 |
| 2014/0112540 | A1 * | 4/2014 | el Kaliouby ....... G06Q 30/0271 382/103 |
| 2015/0067119 | A1 * | 3/2015 | Estevez .................. H04L 67/34 709/223 |
| 2015/0269567 | A1 * | 9/2015 | Green .................. G06Q 20/425 705/44 |
| 2015/0272504 | A1 | 10/2015 | Giancardo et al. |
| 2015/0348162 | A1 * | 12/2015 | Morris ............... G06Q 30/0631 705/26.7 |
| 2016/0005044 | A1 * | 1/2016 | Moss ................. G06Q 20/4016 705/44 |
| 2016/0275623 | A1 | 9/2016 | Biemer et al. |
| 2016/0327542 | A1 * | 11/2016 | Nothacker ............ A61B 5/7445 |
| 2016/0328572 | A1 * | 11/2016 | Valacich ................ A61B 5/164 |
| 2017/0140141 | A1 | 5/2017 | Yan et al. |
| 2019/0132205 | A1 * | 5/2019 | Du ...................... H04L 41/0816 |
| 2019/0180201 | A1 * | 6/2019 | Legault .................. G06Q 50/40 |
| 2019/0336046 | A1 * | 11/2019 | Shuster .................. G16H 50/20 |
| 2020/0051189 | A1 * | 2/2020 | Williams .............. H04L 67/535 |
| 2020/0279274 | A1 * | 9/2020 | Hearty .................. H04L 67/535 |
| 2020/0390337 | A1 * | 12/2020 | Frank .................... G01J 5/0265 |
| 2021/0264395 | A1 * | 8/2021 | Trelin .................. G06Q 20/206 |

FOREIGN PATENT DOCUMENTS

| | | | | |
|---|---|---|---|---|
| EP | | 3407281 A1 * | 11/2018 | ........... G06Q 20/405 |
| WO | WO-2017048730 A1 * | | 3/2017 | ............. G06F 17/00 |

OTHER PUBLICATIONS

Yoshimizu, Kengo, Noriko Takemura, Yoshio Iwai, and Kosuke Sato. "Multi-sensor-based ambient sensing system for the estimation of comfort/discomfort during desk work." In 2014 IEEE/SICE International Symposium on System Integration, pp. 425-430. IEEE, 2014. (Year: 2014).*
Sigg, Stephan, Kai Kunze, and Xiaoming Fu. "Recent advances and challenges in ubiquitous sensing." arXiv preprint arXiv: 1503. 04973 (2015). (Year: 2015).*
Dong, Yanchao, Zhencheng Hu, Keiichi Uchimura, and Nobuki Murayama. "Driver inattention monitoring system for intelligent vehicles: A review." IEEE transactions on intelligent transportation systems 12, No. 2 (2010): 596-614. (Year: 2010).*
This new app stops you from making purchases while drunk. https://www.techspot.com/news/69291-new-app-stops-you-making-purchases-while-drunk.html#:~:text=DrnkPay%2C%20developed%20by%20financial%20consultants,to%20a%20breathalyzer%20or%20biosensor. (Year: 2017).*
Inferring Fine-grained Details on User Activities and Home Location from Social Media: Detecting Drinking-While-Tweeting Patterns in Communities (Year: 2016).*
htttps://www.reddit.com/r/indesign/comments/4bobwq/creating_forms_with_boxes_for_individual_printed/ (citing http://www.wcc.state.md.us/images/headers/C1hwcrop.gif (last visited Nov. 22, 2023)) (Year: 2015).*
Artificial Neural Network for Gait Analysis to Estimate Blood Alcohol Content Level (Year: 2017).*
Reducing Drinking Among People Experiencing Homelessness: Protocol for the Development and Testing of a Just-in-Time Adaptive Intervention (English) (Year: 2020).*
Using a mobile health application to reduce alcohol consumption: a mixed-methods evaluation of the drinkaware track & calculate units application (English) (Year: 2017).*
Your Data in Your Hands: Privacy-preserving User Behavior Models for Context Computation (Year: 2017).*
DrinkSense: Characterizing Youth Drinking Behavior Using Smartphones (Year: 2018).*
Using mobile sensing to detect indicators of alcohol intoxication (Year: 2018).*
Drunk User Interfaces: Determining Blood Alcohol Level through Everyday Smartphone Tasks (Year: 2018).*
Crockett "The 2019 Drunk Shopping Census", Mar. 24, 2019, https://thehustle.com/drunk-shopping-survey.
Lee—U.S. Appl. No. 16/818,293, filed Mar. 13, 2020.
Hearty—U.S. Appl. No. 16/804,719, filed Feb. 28, 2020.

* cited by examiner

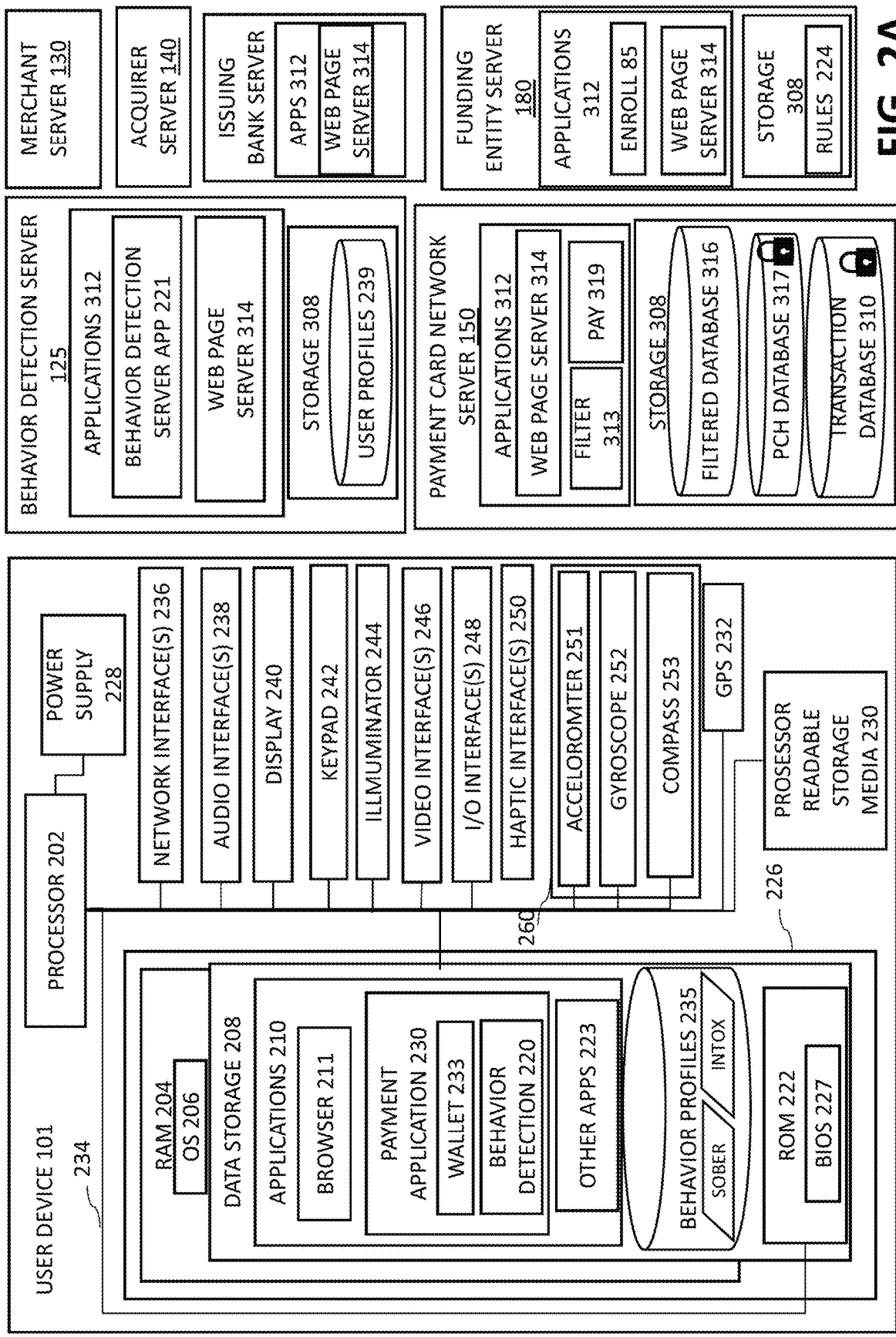

Enrollment  85  Hardware Permissions  90  Service Tracker in Issuer UI  95

SYSTEM, METHOD, AND DEVICE FOR DETECTING THAT A USER IS INTOXICATED WHEN PROCESSING PAYMENT CARD TRANSACTIONS

BACKGROUND OF THE DISCLOSURE

1. Field of the Disclosure

The present disclosure relates to a method and a system for a payment card system and payment card system transaction processing.

2. Description of the Related Art

As more controlled substances move from illegal to public availability for recreational use, the potential for negative results to occur becomes more likely. While there are catastrophic outcomes such as death and that can stem from engaging with these substances, there is also a higher likelihood that someone engaging with an application or website for online shopping, only to wake up the next morning with a feeling of buyer's remorse from "drunk shopping". In addition, for the merchant community, these types of purchases will inadvertently result in an increased number of returns and potentially negative brand equity.

Accordingly, there is need for technological solutions to prevent a user from poor decisions when intoxicated while shopping at merchant locations or on their smartphone, tablet, or computer. It would also be advantageous if a user device and electronic consumer platform could provide an improved device for preventing driving while intoxicated.

SUMMARY OF THE DISCLOSURE

In view of the foregoing, described are systems and methods that provide a technological platform to detect user behavior and process payment card transactions. In particular, the technological platform can detect if a user is intoxicated or sober and process payment card transactions in conjunction with the behavior detection.

In an embodiment, described is a method for payment transaction processing in conjunction with behavior detection, the method comprising:
  monitoring a user's interactions with a user device with a behavior detection application;
  generating a behavior profile for the user based on the user's interactions with the user device, the behavior profile including a sober profile and an intoxicated profile;
  receiving, at a payment network server, a payment card transaction for the user; and
  implementing a transaction control protocol for the transaction if the behavior detection application determines the user activity meets the intoxicated profile or the sober profile.

In an embodiment, the method can further comprise offering a user device an enrollment interface for a behavior detection platform; and downloading the behavior detection application to the user device.

In an embodiment, the monitored interactions with the user device can comprise interactions selected from the group consisting of, for example, endpoint data, application level data, and motion detection data from the user device's motion detection sensors. The motion detection sensors can comprise sensors selected from, for example: a compass, a gyroscope, and an accelerometer.

In an embodiment, the behavior profile can further comprise at least one of:
  offering an interface to allow the user to select one or more payment card transactions when the user is intoxicated; and
  offering an interface to allow the user to identify themselves as intoxicated.

In an embodiment, generating the behavior profile can further comprise:
  placing a behavior detection application into a learning state;
  mapping the user's interactions with the user device to behavior element values to establish baseline criteria when the user is sober; and
  identifying behavior element values that deviate from the baseline criteria to establish when the user is intoxicated.

In an embodiment, generating the behavior profile can further comprise obtaining permissions and configuring the user device to allow the behavior detection application to monitor the user's interactions with the user device. Generating the behavior profile can also further comprise generating a notification for the user device that the behavior detection application is in the learning state; and generating a notification that the behavior profile is active. In an embodiment, generating the behavior profile can further comprise: transmitting the notification to the behavior detection server; and saving the user's behavior profile in a user profile database of the behavior detection server.

In an embodiment, the method can further comprise:
  determining, at the payment network server, that the transaction is subject to behavior controls if the behavior detection application determines the user activity meets the intoxicated profile or the sober profile;
  transmitting, from the payment network server, a behavior profile check to the behavior detection server;
  transmitting, from the behavior detection server to the behavior detection application at the user device, a behavior profile check request to report if the user is intoxicated or sober;
  determining, by the behavior detection application, if the user interaction data meets the sober profile or the intoxicated profile of the user's behavior profile; and
  transmitting, by the behavior detection application, response for meeting the intoxication profile or the sober profile to the behavior detection server based on the behavior profile.

The method can further comprise updating the behavior profile to indicate that the transaction is being made based on the sober profile or the intoxicated profile.

In an embodiment, the control protocol for the transaction can comprise transmitting an authorization request to a funding entity server to authorize a payment of the transaction from a sponsor funding entity account.

In an embodiment, the funding entity server is configured to authorize the payment and a payment amount based on a transaction payment criterion, and the transaction payment criterion comprises a criterion selected from, for example: a number of transactions; a transaction time; a payment share, and a merchant category. A merchant category can be, for example, a transaction for a transportation service.

In an embodiment, the control protocol for the transaction can comprise denying a transaction if the behavior detection application determines the user meets the intoxicated profile.

In an embodiment, the control protocol denying the transaction can comprise:

transmitting a notification from the payment network server to an issuer server that the behavior detection application has identified the user as intoxicated;

placing a hold on the transaction approval;

transmitting an approval request for the transaction to the behavior detection server;

transmitting a query from the behavior detection server to the behavior detection application asking if the user wants to authorize the transaction;

authorizing the transaction only when the user inputs an authorization for the transaction; and canceling the transaction if the user does not authorize the transaction.

In an embodiment, the control protocol denying the transaction can comprise a criterion selected from, for example, a threshold payment amount, a transaction time, a transaction type, and a merchant category.

In an embodiment, described is a system comprising:

a behavior detection server comprising a processor and operatively connected to a user device;

the user device comprising a behavior detection application being configured to at least:

monitor a user's interactions with the user device;

generate a behavior profile for the user based on the user's interactions with the user device, the behavior profile including a sober profile and an intoxicated profile; and detect if the user meets the sober profile or the intoxicated profile;

a payment processing system comprising a processor configured for processing a payment card transaction, the processing comprising:

receiving a payment card transaction for the user; and implementing a transaction control protocol for the transaction if the behavior detection application determines the user activity meets the intoxicated profile or the sober profile.

In an embodiment, the user device comprises motion detection sensors comprise sensors selected from, for example, a compass, a gyroscope, and an accelerometer; and the behavior detection application being can be configured to monitor interactions with the user device comprising interactions selected from the group of, for example: endpoint data, application level data, and motion detection data from the user device's motion detection sensors In an embodiment, the control protocol for the transaction can comprise a control protocol selected from the group of, for example: denying authorization of the payment card transaction; and transmitting an authorization request to a funding entity server to authorize a payment of the transaction from a sponsor funding entity account.

BRIEF DESCRIPTION OF THE DRAWINGS

FIGS. 2A-2B illustrates a logical architecture and computers for a system for behavior detection in accordance with an embodiment.

DESCRIPTION OF THE EMBODIMENTS

Figure 1A:
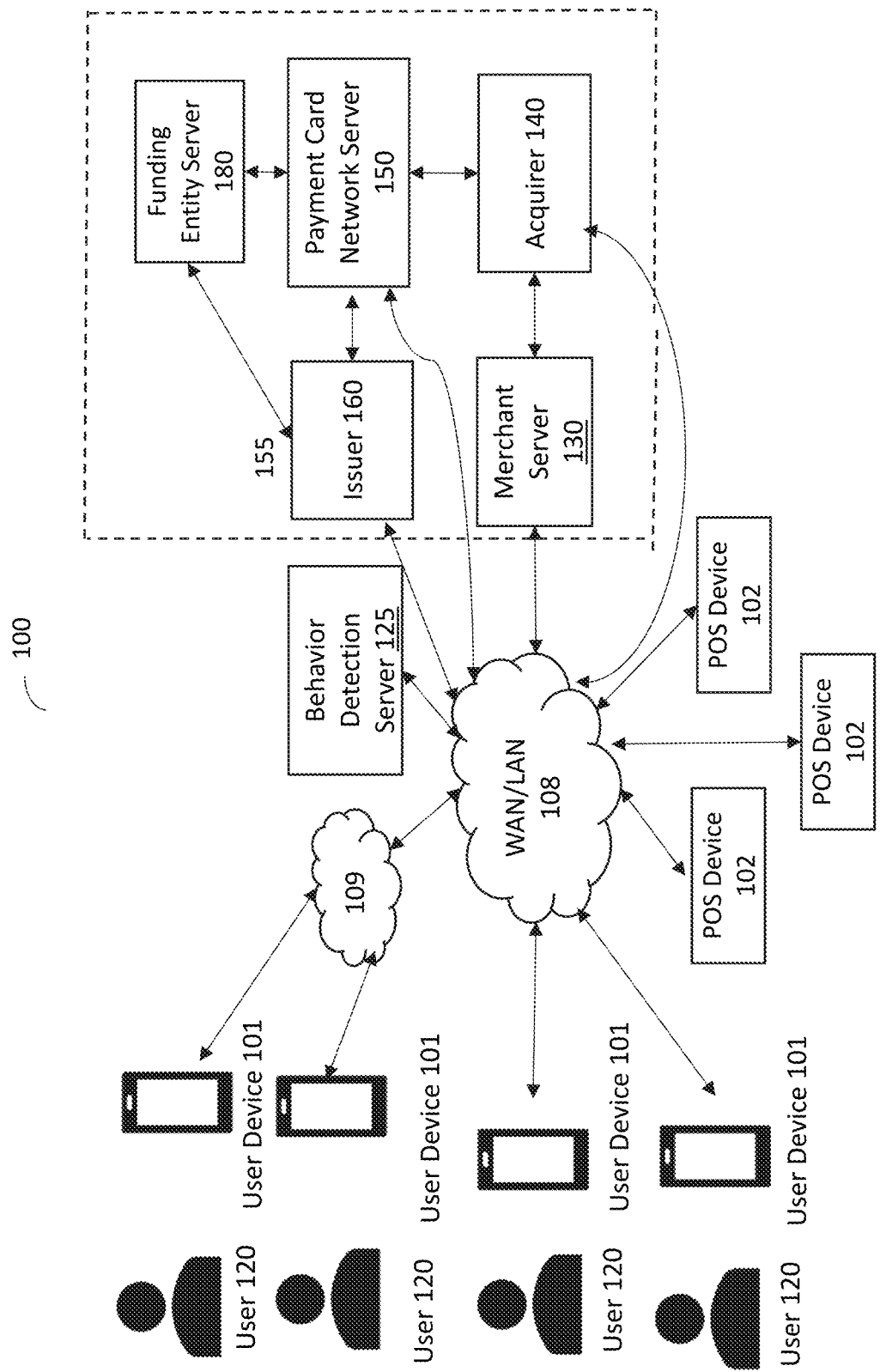
FIGS. 1A-1B show an embodiment of a system for a payment card network system including a behavior detection platform.

Embodiments of the present disclosure are described more fully hereinafter with reference to the accompanying drawings, in which some, but not all, embodiments of the present disclosure are shown. Indeed, the present disclosure can be embodied in many different forms and should not be construed as limited to the embodiments set forth herein. Rather, these embodiments are provided so that this disclosure clearly satisfies applicable legal requirements.

As used herein, entities can include one or more persons, organizations, businesses, institutions and/or other entities, such as financial institutions, enterprises, service providers, and the like that implement one or more portions of one or more of the embodiments described and/or contemplated herein.

The steps and/or actions of a method described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some embodiments, the processor and the storage medium can reside in an Application Specific Integrated Circuit (ASIC). In the alternative, the processor and the storage medium can reside as discrete components in a computing device. Additionally, in some embodiments, the events and/or actions of a method can reside as one or any combination or set of codes and/or instructions on a machine-readable medium and/or computer-readable medium, which can be incorporated into a computer program product.

In one or more embodiments, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage device, or any other medium that can be used to carry or store desired program code in the form of instructions or data structures, and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc" as used herein, include compact disc (CD), laser disc, optical disc, digital versatile disc (DVD), floppy disk and blu-ray disc where disks usually reproduce data magnetically, while discs usually reproduce data optically with lasers. Combinations of the above are included within the scope of computer-readable media.

Computer program code for carrying out operations of embodiments of the present disclosure can be written in an object oriented, scripted or unscripted programming language such as Java, Perl, Ruby, Python, Smalltalk, C++, or the like. However, the computer program code for carrying out operations of embodiments of the present disclosure can also be written in conventional procedural programming languages, such as the "C" programming language or similar programming languages.

These computer program instructions can also be stored in a computer-readable memory that can direct a computer or other programmable data processing apparatus to function in a particular manner, such that the instructions stored in the computer readable memory produce an article of manufacture including instruction means that implement the function/act specified in the flowchart and/or block diagram block(s).

The computer program instructions can also be loaded onto a computer or other programmable data processing apparatus to cause a series of operational steps to be performed on the computer or other programmable apparatus to produce a computer-implemented process so that the instructions that execute on the computer or other programmable apparatus provide steps for implementing the functions/acts specified in the flowchart and/or block diagram block(s). Alternatively, computer program implemented steps or acts can be combined with operator or human implemented steps or acts in order to carry out an embodiment of the present disclosure.

Referring to the drawings and, in particular, FIG. 1A, in an embodiment there is shown a system for a payment card network system 100 including a behavior detection platform.

Figure 1B:
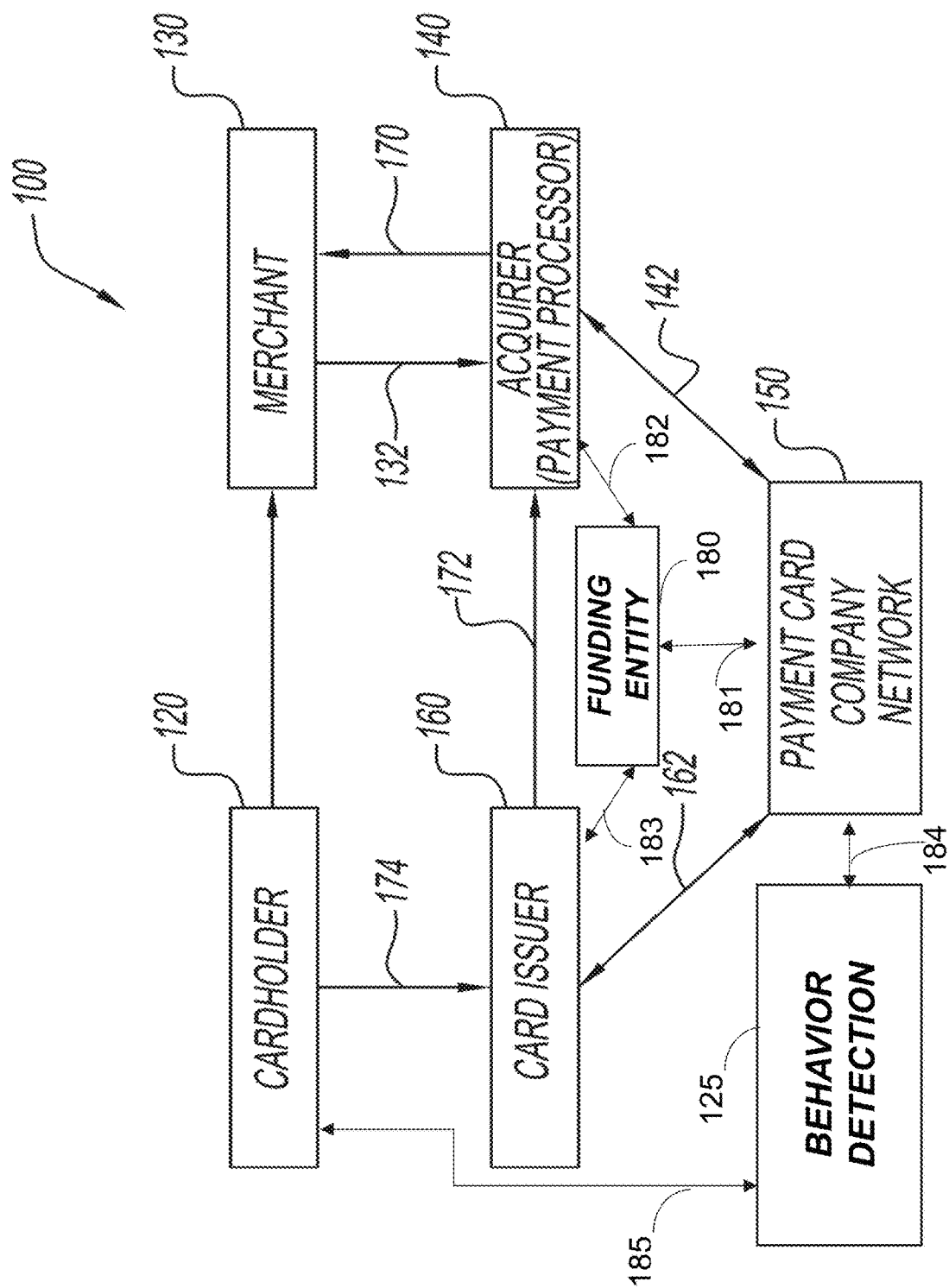

Referring to the drawings and, in particular, FIG. 1B, in an embodiment there is shown a four party payment (credit, debit or other) card system architecture together with a behavior detection server 125 and a funding entity server 180, generally represented by reference numeral 100.

In card system 100, card holder user 120 submits the payment card to the merchant server 130. A merchant's point of sale (POS) device 102 communicates 132 with their acquiring bank or acquirer server 140, which acts as a payment processor.

A payment processing network includes an acquirer server 140, a payment card network server 150, and an issuer server 160 of an issuer bank, which communicates via a secure network path, for example, using secure payment card transaction databases and communications that are Payment Card Industry (PCI) Data Security Standard compliant. The acquirer server 140 initiates, at 142, the transaction on the payment card network server 150. The payment card network server 150 (that includes a financial transaction processing company) routes, via 162, the transaction to the issuing bank or card issuer server 160, which is identified using information in the transaction message. The card issuer server 160 approves or denies an authorization request, and then routes, via the payment card network server 150, an authorization response back to the acquirer server 140. The acquirer server 140 sends approval to the POS device 102 of the merchant. Thereafter, seconds later, if the transaction is approved, the card holder completes the purchase and receives a receipt. The account of the merchant is credited, via 170, by the acquirer. The card issuer server 160 pays, via 172, the acquirer server 140. Eventually, the card holder user 120 pays, via 174, the card issuer server 160.

As will be appreciated, the present disclosure also can be implemented in a three party system, such as payment card systems where an acquiring bank or acquirer server 140 is the same as the card issuing bank or issuer server 160.

In an embodiment, the system can include a funding entity server 180 can approve or deny a request in conjunction with a transaction. An exemplary advantage of an embodiment is to automatically reward individuals for taking alternate transportation when intoxication has been detected. A funding entity can agree to offset the costs, or cover the costs completely, of alternate transportation for an intoxicated cardholder user 120. The entity funding the incentive can be, for example, a government agency (e.g. local, state, federal) an insurance company, a non-profit looking to prevent drunk driving (e.g. M.A.D.D.), a caring family member, a rideshare company, or any entity so motivated. As noted above, a card issuer server 160 approves or denies an authorization request, and then routes, via the payment card network server 150, an authorization response back to the acquirer server 140. The payment card network server 150 can also make an authorization request to a funding entity server 180 via secure communication 181 for a share of the payment. The funding entity server 180 approves or denies an authorization request, and then routes, via the payment card network server 150, an authorization response back to either the issuer server 160 via 162 or directly to the acquirer server 140 via 142. The acquirer server 140 sends approval to the POS device 102 (FIG. 1A) of the merchant. Thereafter, seconds later, if the transaction is approved, the card holder user 120 completes the purchase and receives a receipt. The funding entity also receives a receipt for their share of the purchase.

In an embodiment, the system can include a behavior detection server 125 that can detect cardholder user 120 behavior via a secure communication 185 with a behavior detection application on a user device 101 (FIG. 1A). As described in more detail below, the payment card network server 150 can query the behavior detection server 125 via secure communication 184 to determine if a cardholder user 120 is intoxicated or sober when making a payment card transaction.

The account of the merchant is credited, via 170, by the acquirer. The card issuer server 160 and the funding entity server 180 pays, via 172 and 182 respectively, the acquirer server 140. Eventually, the card holder user 120 and the funding entity server 180 pays, via 174, the card issuer server 160. In another embodiment, the card issuer server can pay the entire transaction and the funding entity server 180 can pay the card issuer for its share via secure communication 183.

A portion of a payment card system used in accordance with the present disclosure is shown. Each merchant that accepts a payment card has on their premises at least one card swiping machine or point of sale device 380, of a type well known in the art, for initiating customer transactions. These POS devices 102 generally have a keyboard data pad for entering data when a card's magnetic coding becomes difficult to read, or for the purpose of entering card data resulting from telephone calls during which the customer provides card data by telephone.

A POS device 102 can also be configured to support payment card transactions executed via digital wallets 233 on a user device 101, for example, Apple Pay™ or Google Wallet™. Point of sale device 102 as described herein includes electronic commerce transactions over a merchant website or payment card network commerce website configured to process payment card transactions for payment card holder user 120 transacting over the internet on a user device 101. A POS device 102 can include or be extended to a user via voice-enabled virtual assistant devices and virtual assistant servers (not shown) to support payment card transactions executed via digital wallets 233. An exemplary architecture for executing payment card transactions using voice-enabled virtual assistant devices and virtual assistant servers is described in U.S. patent application Ser. No. 16/818,293, filed on Mar. 13, 2020, the entirety of which is incorporated by reference hereby.

Figure 2B:
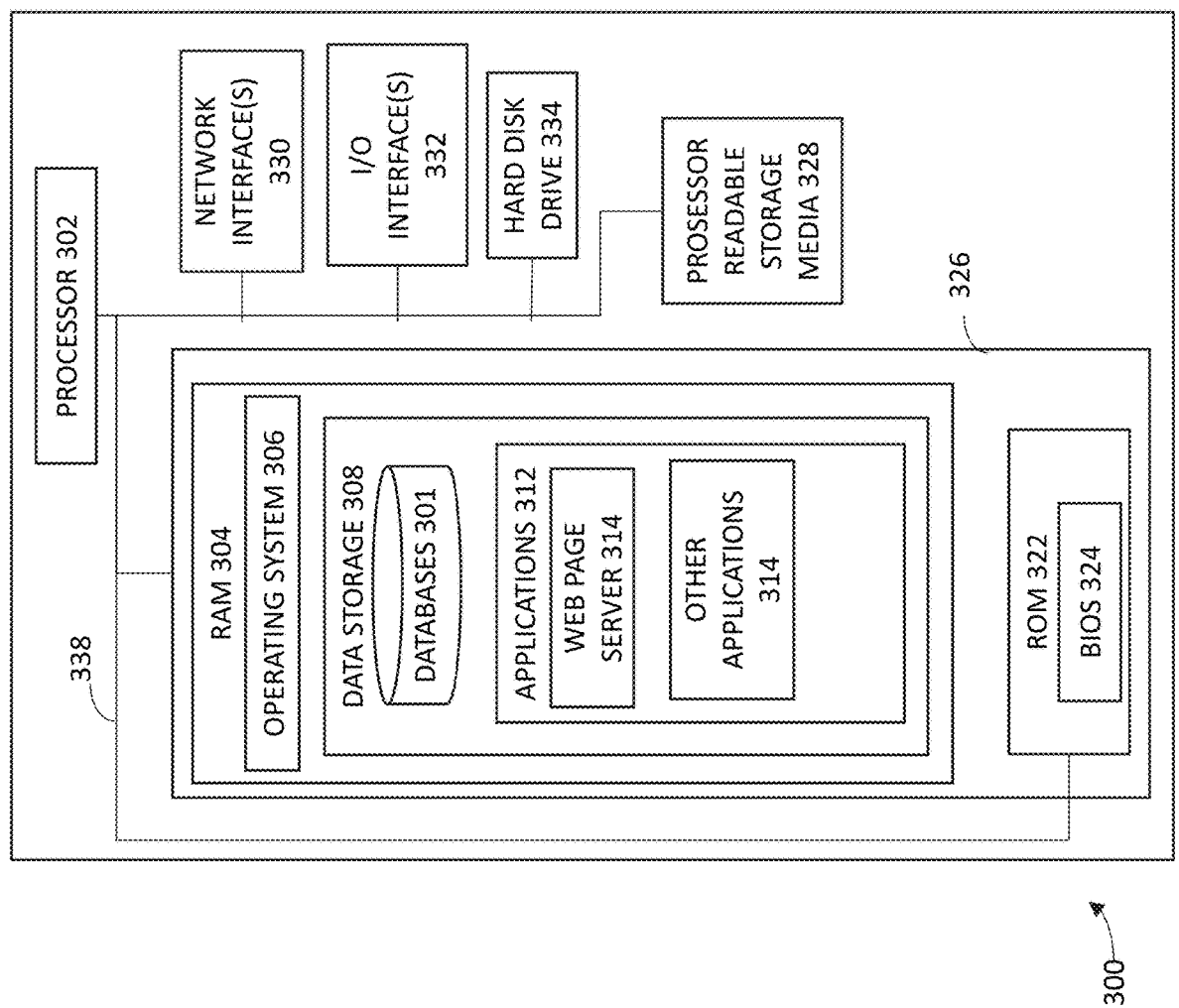

Point of sale devices 102 and user devices 101 are connected by a suitable card payment network 155 (e.g. via the payment card network server 150) to a transaction database 310 associated with or within network 155 that stores information concerning the transactions. The transaction database 310 can included in data storage 308 (as shown in FIGS. 2A-2B), for example, in a data warehouse. An example of such a network 155 is BankNet operated by MasterCard International Incorporated. BankNet is a four party payment network that connects a card issuer server 160, a card holder user 120, merchant server 130, and an acquirer server 140. In another embodiment, network 155 can be a three party system. In any such embodiment, POS devices 102 do not have direct access to transaction database 310. It is the operator of network 155 that can access transaction database 310.

Point of sale devices 102 can be connected by a suitable network 109 to a transaction concentrator (not shown), for a given geographic area, which concentrates the transaction information. Each concentrator has associated with it a transaction database 310 that stores information concerning the transaction. Transaction database 310 may acquire information from more than one concentrator, and thus may include data from a wide geographic area. Information from the concentrator also is routed to a respective acquirer server 140 that, in turn, routes the information so that transactions are properly completed.

While it can be advantageous to maintain a local database including transactions in a given geographic area, there is no such limitation on various embodiments of the present disclosure. For example, if the present disclosure is used with a three party system, data for a relatively large geographic region may be stored in a single database at a central location. The time to search this more extensive database, and provide a response to a user, can be slightly greater, but the user will obtain the same useful information. If the product is to be ordered via the Internet, then it is advantageous to provide information on a much broader geographic basis, including national or international information.

Information that is exchanged across the network for each credit or debit card financial transaction message includes the following characteristics: acquirer identifier/card accepter identifier (the combination of which uniquely defines the merchant); merchant address (i.e., full address and or GPS data); merchant category code (also known as card acceptor business code), that is an indication of the type of business the merchant is involved in (for example, a gas station); local transaction date and time, cardholder base currency (i.e., U.S. Dollars, Euro, Yen, etc.), the transaction environment or method being used to conduct the transaction, product specific data such as SKU line item data, and cost of the transaction.

Transaction records stored in transaction database 310 contain information that is highly confidential and must be maintained confidential to prevent fraud and identity theft. The transaction records stored in transaction database 310 can be anonymized by using a filter 313 that removes confidential information, but retains records concerning all of the other transaction related details discussed above, preferably in real time. Anonymized data is generally necessary for marketing applications. The filtered data is stored in a filtered transaction database 316 that can be accessed by external entities, for example, via a web portal.

Payment card network server 150 includes a payment card holder database 317 which includes payment cardholder information. Payment card holder information includes personal identity information, including name and payment card number, and is also highly confidential and must be maintained confidentially to prevent fraud and identity theft. In an embodiment, the payment card holder database 317 can also include enrollment information identifying that a payment card holder is enrolled in a behavior detection program. In an embodiment, the payment card holder database 317 can also include enrollment information identifying that a funding entity funds part or all of a transaction for a payment card holder that is enrolled in a behavior detection program.

Wireless network 109 is configured to couple user device 101 and its components with network 109. Wireless network 109 can include any of a variety of wireless sub-networks that can further overlay stand-alone ad-hoc networks, and the like, to provide an infrastructure-oriented connection for user device. Such sub-networks can include mesh networks, Wireless LAN (WLAN) networks, cellular networks, and the like. In one embodiment, the system can include more than one wireless network.

Wireless network 109 can further include an autonomous system of terminals, gateways, routers, and the like connected by wireless radio links, and the like. These connectors can be configured to move freely and randomly and organize themselves arbitrarily, such that the topology of wireless network 109 can change rapidly.

Wireless network 109 can further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks can enable wide area coverage for mobile devices, such as client computers with various degrees of mobility. In one non-limiting example, wireless network 109 can enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 109 can include virtually any wireless communication mechanism by which information can travel between client computers and another computer, network, and the like.

Network 109 is configured to couple network computers with other computers and/or computing devices, including, behavior detection server 125, service, content or merchant server 130, and payment processing system 155 servers through wireless network 109. Network 109 is enabled to employ any form of computer readable media for communicating information from one electronic device to another. Also, network 109 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks can utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links can further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 109 can be configured to transport information of an Internet Protocol (IP). In essence, network 109 includes any communication method by which information can travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

FIG. 2A illustrates a logical architecture of system 100 for behavior detection in accordance with at least one of the various embodiments.

FIG. 2A shows an embodiment of user device 101 client computer that can be included in a system implementing embodiments. User device can include many more or less components than those shown in FIG. 2A. However, the components shown are sufficient to disclose an illustrative embodiment.

As shown in the FIG. 2A, user device 101 includes a processor 202 in communication with a mass memory 226 via a bus 234. In some embodiments, processor 202 can include one or more central processing units (CPU). User device also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232. In an embodiment, the client device comprises a motion coprocessor for motion sensing hardware 260, including an accelerometer 251, a gyroscope 252, and a compass 253.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 227 for controlling low-level operation of client computer 200. The mass memory also stores an operating system 206 for controlling the operation of client computer 200. It will be appreciated that this component can include a general-purpose operating system such as a version of UNIX, or LINUX™, or a specialized client communication operating system such as Microsoft Corporation's Windows™, Apple Corporation's iOS™, Google Corporation's Android™ or the Symbian® operating system. The operating system can include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 can also be employed to store information that describes various capabilities of client computer 200. The information can then be provided to another computer based on any of a variety of events, including being sent as part of a header during a communication, sent upon request, or the like. Data storage can be used to store behavior profiles 235 for a user, including intoxicated profiles and sober profiles. Data storage 208 can also be employed to store social networking information including address books, buddy lists, aliases, user profile information, or the like. Further, data storage 208 can also store message, web page content, or any of a variety of user generated content. At least a portion of the information can also be stored on another component of client computer 200, including, but not limited to processor readable storage media 230, a disk drive or other computer readable storage devices (not shown) within client computer 200.

Processor readable storage media 230 can include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), solid state devices, digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 can also be referred to herein as computer readable storage media and/or computer readable storage device.

A user device 101 having a display can have a series of applications 210 or applets thereon including an applet or application program (hereinafter an application or app) for use with the embodiment described herein. Applications 210 can include computer executable instructions, which can be loaded into mass memory and run on an operating system. Examples of application programs can include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 210 can also include web browser 211, payment application 230, digital wallet 233, behavior detection application 220, and other applications 223.

Applications 210 can be configured to be hosted on host server computers. In at least one of the various embodiments, applications 210 or components of applications 210 can also be operative on behavior detection server 125, merchant server 130, issuer server 160, acquirer server 140, payment card network server 150, or funding entity server 180. In an embodiment, the applications 210 implemented at application 210 layer in the user device 101 can be passed to the servers via an API. Applications 210 can employ processes, or parts of processes, similar to those described in conjunction with FIGS. 3-6, to perform at least some of its actions.

As shown in FIG. 2A, in an embodiment, user device 101 includes a payment application 230 configured with a digital wallet 233 and a behavior detection application 220. The behavior detection application 220 is configured to monitor user 120 interaction with the user device 101 to detect intoxication. In an embodiment, the behavior detection application 220 is configured to monitor endpoint device interactions (e.g. information related to the user's 120 interaction on the user device 101), application 210 level data, and endpoint device hardware data from a motion coprocessor and motion sensors 260 (e.g. compass 253, gyroscope 252, accelerometer 251). In an embodiment, the behavior detection application 220 is implemented at application 210 layer in the user device 101, and all data is passed to the behavior detection server 125 via an API to the behavior detection server 125.

The user device 101 can be used to access a website on the Internet, via a hardwired or Internet connected Wi-Fi hot spot (or by any telephone network, such as a 3G, 4G or 5G system, on which user device 101 communicates), by using payment application 230, web browser 211, behavior detection application 220, or other applications 223.

In an embodiment, the behavior detection application 220 includes controls that allow the user to control permissions for the behavior detection application's 220 access to the hardware, application level data, an endpoint interaction data from the user device 101.

In an embodiment, the behavior detection application 220 is configured to allow the user to generate sober and intoxicated behavior profiles which are stored as behavior profiles 235 from tracked and stored data from the user device 101. The behavior detection application is configured with an "always on" learning state, whereby the behavior detection application 220 gathers the hardware, application 210 level data, an endpoint interaction data from the user device 101 to generate the behavior profiles 235. In an embodiment, the behavior detection application 220 can identify intoxicated transactions, for example via integration with the payment application 230, to accelerate the completion of baselines for the behavior profiles 235.

Accordingly, in an embodiment, the behavior detection application 220 is configured to collect the endpoint data and transmit it to the behavior detection application server 221 of the behavior detection server 125. The behavior detection server 125 is configured to perform the behavior detection to evaluate endpoint sensor data and input data by evaluating a broad set of attributes that enable a behavior detection model to distinguish between intoxicated behavior and sober behavior. An exemplary behavior detection server 125 and behavior detection server platform is described in U.S. patent application Ser. No. 16/804,719 entitled ONLINE APPLICATION ORIGINATION (OAO) SERVICE FOR FRAUD PREVENTION SYSTEMS, filed on Feb. 28, 2020, the entirety of which is incorporated by reference hereby.

For example, the behavior detection application 220 is configured to track and store endpoint data from user device interactions including:

Length of text field inputs;
Baseline—expected vs actual—form for service/texting—novel length text (baseline) short/deviation;
Location of mouse pointer within the browser window;
Modifier key details (e.g. CTRL, SHIFT);
Timing and identification of focus and blur events (e.g. for pointer);
Active field, mouse over, form field (focus) and rest (blur);
Timing and location of mouse clicks;
Timing and location of touch events;
Timing between keystrokes; and
Window scroll position.

The application 210 level data the behavior detection application 220 is configured to track from user device 101 and can include the above-referenced endpoint data, for example, form field lengths compared to text, form field values and/or known values (e.g.: area code, country/state, email address, postal codes, and so on), session identifiers and state changes (e.g. validation errors, completed actions, and so on).

For example, the behavior detection server 125 can separate sober behaviors and intoxicated behaviors by differentiating their behavior, for example, by detecting common manual intoxicated approaches (for example: timing between keystrokes, mouse pointer events) or assessing user familiarity with the data in highly memorable fields on web forms (for example, a Full Name field and a Phone Number field). This assessment of user familiarity can be based on how encrypted data is entered into the highly memorable fields. In an embodiment, the behavior detection server application 221 does not receive or process any of the encrypted data that is entered into the various fields.

Table 1 below sets forth exemplary features that can be included in a feature set of a behavior detection model, for example, on web pages with form fields.

TABLE 1

| Feature Name | Feature Description |
| --- | --- |
| time_last_key_submit_ms | $totalTimeMS incremented per event; Total time-last key time calculated after all events processed; Calculated per page or calculated based on last page |
| avg_focus_key_time | Focus to first key pressed delta calculated per field; Average calculated on data export |
| tot_mouse_dist | Total mouse distance; Move events accumulated as processed; Distance calculated after all events processed; Distance between pages may be included or excluded |
| mc_Y_std | standard deviation of mouse click in Y direction; Mouse click events accumulated as processed; STD calculated when value requested |
| ks_coef_var | coefficient of variation of keystroke rate across all fields on page |
| mc_X_std | standard deviation of mouse click in X direction; Mouse click events accumulated as processed; STD calculated when value requested |
| avg_ks_rate_ms_std | Standard deviation of average keystroke rate is calculated per field; Average calculated on data export |
| infield_time_ratio | ratio of time spent in fields (when focused in) to the overall time on page. mTotalTimeInFieldsMS/ mTimeOnPageMS Total time incremented per event; Time in fields calculated per field |

TABLE 1-continued

| Feature Name | Feature Description |
| --- | --- |
| time_on_page_ms | Total time incremented per event; calculated per page or a sum of all pages |
| total_mc_count | Count incremented on each mouse click event |
| avg_field_clicks | average number of mouse clicks per field; Form focus events accumulated as processed; Mean calculated when value requested |
| total_ks_count | Keystroke count calculated per field; Counts summed on data export |
| avg_ff2firstevent | Form focus events accumulated as processed; Average calculated when value requested |
| multi_focus_field_perct | Form focus events accumulated as processed; Percentile calculated when value requested |

In some examples, the user behavior detection application 220 collects endpoint data, and the behavior detection server 125 can receive endpoint data when the behavior detection application 220 stores the endpoint data in memory and transmits this information to the behavior detection server 125. For example, the behavior detection application 220 can transmit this information to the behavior detection server 125 in real-time or near real-time. The behavior detection application 220 can also be configured to collect and store the endpoint data and transmit it at a later time.

In an embodiment, the behavior detection server 125 can partially or completely host the user device 101 behavior detection application 220. For example, the behavior detection server 125 can directly store endpoint data transmitted from the behavior detecting application 220 in data storage 308, for example in user profiles database 239.

In another embodiment, one or more of the user devices 101 behavior detection application 220 can be configured with a behavior detection model configured to produce a decision on sober and intoxicated profiles on the respective user device. For example, the one or more of the user devices 101 can directly store endpoint in data storage 208, for example in behavior profiles database 235.

As described above, user device 101 is in communication with a four party payment card network 100 that includes a behavior detection server 125 and a funding entity server 180. FIG. 2B shows an embodiment of a network computer 300 that can be used for payment card network server 150, acquirer server 140, issuer server 160, behavior detection server 125, funding entity server 180, and a content or service server such as merchant server 130. Network computers 300 that can be arranged to operate as a payment card network server 150, acquirer server 140, issuer server 160, behavior detection server 125, funding entity server 180, or a content or service server such as merchant server 130 include various network computers 300, including, but not limited to multiprocessor systems, microprocessor-based or programmable consumer electronics, network PCs, server computers, network appliances, cloud servers and the like. In embodiments described herein, server computers providing services or content are in environments requiring secure user authentication. For instance, exemplary embodiments of Payment Card Industry (PCI) Data Security Standard (PCI DSS) compliant payment card systems are described herein. PCI DSS compliant systems provide a baseline of technical and operational requirements designed to protect account data. PCI DSS applies to all entities involved in a payment card processing system—including merchants, payment processors, acquirers, issuers, and service providers. PCI DSS also applies to all other entities that store, process or transmit cardholder data (CHD) and/or sensitive authentication data (SAD).

Although FIG. 2B illustrates network computer 300 as a single computer, the embodiments are not so limited. For example, one or more functions of the computer 300 can be distributed across one or more distinct network computers 300. Moreover, network server computer 300 is not limited to a particular configuration. Network server computer 300 can contain a plurality of network computers. For example, the network server computer 300 can operate as a plurality of network computers arranged in a master/slave architecture, a cluster architecture, a peer-to-peer architecture, and/or within a cloud architecture. Thus, embodiments are not to be construed as being limited to a single environment, and other configurations, and architectures are also envisaged.

Network computer 300 includes processor 302, processor readable storage media 328, network interface unit 330, an input/output interface 332, hard disk drive 334, and memory 326, all in communication with each other via bus 338. In some embodiments, processor 302 can include one or more central processing units.

As illustrated in FIG. 2B, network computer 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 2B. Input/output interface 332 can utilize one or more communication technologies, such as USB, infrared, Bluetooth™, or the like.

Memory 326 generally includes RAM 304, ROM 322 and one or more permanent mass storage devices, such as hard disk drive 334, solid state drive (SSD), tape drive, or optical drive. Memory 326 stores operating system 306 for controlling the operation of network computer 300. Any general-purpose operating system can be employed. Basic input/output system (BIOS) 324 is also provided for controlling the low-level operation of network computer 300.

Although illustrated separately, memory 326 can include processor readable storage media 328. Processor readable storage media 328 can be referred to and/or include computer readable media, computer readable storage media, and/or processor readable storage device. Processor readable storage media 328 can include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 312 and/or other data such as content 310. For example, data storage 308 can also be employed to store information that describes various capabilities of network computer 300. The information can then be provided to another computer based on any of a variety of events, including being sent as part of a header during a communication, sent upon request, or the like. Data storage 308 can also be employed to store messages, web page content, or the like. At least a portion of the information can also be stored on another component of network computer 300, including, but not limited to processor readable storage media 328, hard disk drive 334, or other computer readable storage medias (not shown) within client computer 300.

Data storage 308 can include a database 301, text, spreadsheet, folder, file, or the like, that can be configured to maintain and store user account identifiers, user profiles, email addresses, IM addresses, and/or other network addresses; or the like. Data storage 308 can include databases 301, such as transaction database 310, filtered transaction database 316, payment cardholder database 317, user profile database 239, and rules database 224.

Data storage 308 can further include program code, data, algorithms, and the like, for use by a processor, such as processor 302 to execute and perform actions. In one embodiment, at least some of data storage 308 might also be stored on another component of network computer 300, including, but not limited to processor-readable storage media 328, hard disk drive 334, or the like.

Applications 312 can include computer executable instructions, which can be loaded into mass memory and run on operating system 306. Examples of application programs can include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 312 can also include website server 314, behavior detection server application 221, payment processor 319, enrollment server 318 and other applications 311.

As shown in FIG. 2A, in at least one of the various embodiments, a behavior detection server 125 can be arranged to be in communication with payment card network server 150, issuer server 160, merchant server 130, funding entity server 180 or the like. Although a behavior detection server 125 is shown as a separate server and entity, other entities can be configured to include a behavior detection server 125, for example, merchant server 130, issuer server 160, acquirer server 140 or funding entity server 180. Behavior detection server 125 includes a data storage 308 that includes user profiles 239 for users 120. The user profiles can store and update intoxication profiles and sober profiles for each user 120, which correspond to the user behavior profiles 235 stored for client side behavior detection applications 220 for user devices 101.

In at least one embodiment, behavior detection server 125, issuer server 160, merchant server 130, funding entity server 180, and acquirer server 140, can be one or more computers arranged to comprise to include a web page server 314. The behavior detection server 125 can be configured to manage clients and client applications such as those on the user device 101, or the like. For example, behavior detection server 125, merchant server can include one or more web page servers 314 providing web sites, including an online commercial portal and enrollment portal, or the like.

Web page server 314 can represent any of a variety of information and services that are configured to provide content, including messages, over a network to another computer. Thus, website server 314 can include, for example, a web server, a File Transfer Protocol (FTP) server, a database server, a content server, or the like. Web page server 314 can provide messages over the network using any of a variety of formats including, but not limited to WAP, HDML, WML, SGML, HTML, XML, Compact HTML (cHTML), Extensible HTML (xHTML), or the like.

The behavior detection server 125 can also include a behavior detection server application 221 for serving and communicating with the user client behavior detection application 220 as described herein. As noted above, an exemplary behavior detection server 125 and behavior detection server platform is described in U.S. patent application Ser. No. 16/804,719 entitled ONLINE APPLICATION ORIGINATION (OAO) SERVICE FOR FRAUD PREVENTION SYSTEMS, filed on Feb. 28, 2020, the entirety of which is incorporated by reference hereby.

In some examples, the functionality of the behavior detection server application 221 includes a behavior detection model as well as machine learning to generating a machine learning function.

Machine learning generally refers to the ability of a computer program to learn without being explicitly programmed. In some embodiments, a computer program (for example, a learning engine) is configured to construct an algorithm (also referred to herein as a "machine learning function" or "statistical function") based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using one or more of the approaches described above, a computer program can ingest, parse, and understand data and progressively refine algorithms for data analytics. In some examples, the machine learning performed by the behavior detection server 125 in executing the behavior detection is an ensemble machine learning model named XGBoost (eXtreme Gradient Boosting trees), a gradient boosting algorithm implemented for speed and performance. This learning model utilizes many (for example, thousands) of independent trees whose results are aggregated or otherwise combined (e.g. via voting) to produce a final prediction value.

In some examples, one implementation of the machine learning is to extract the statistical function learned by the behavior detection server 125 and deploy the statistical function as a lightweight endpoint (i.e., the behavior detection model stored in the memory 204 on the behavior detection server 125. The behavior detection server 125 can call the behavior detection model with a real data sample to obtain an immediate prediction. This is typically done using an application container such as by using the Docker technology.

In some embodiments, the behavior detection server 125 can be configured to receive a dataset of intoxicated and sober profiles (e.g., hundreds or thousands of example behavior profiles) and to use the machine learning to output an behavior detection model that accounts for the various aspects of the dataset as set forth in the feature set described herein. The behavior detection server 125 can then use the behavior detection model that is generated by machine learning to perform advanced classifications and generate a "intoxicated behavior" score against endpoint data received in real-time. The "intoxicated behavior" score measures the probability that a current transaction is performed by a user actor who is intoxicated. This probability is calculated using real-world data, where the behavior detection server 125 compares thousands of model variants using the dataset from tens of thousands of profiles.

In other examples, another implementation of the machine learning is to extract the statistical function learned by the behavior detection server 125 and deploy the statistical function as a rule in a larger behavior detection platform on the behavior detection server 125. This implementation executes the behavior detection server application 221 as rules alongside other rules folding the behavior detection model (i.e., the statistical function) neatly into a larger behavior detection platform.

The system can be configured to allow an organization, person or other entity to enroll as a funding entity. In an embodiment, a sponsoring bank, financial institution, or other institution permissioned to process payments in a three or four party payment card system comprises a funding entity server 180 configured with an enrollment interface 85 to allow an entity to be a funding entity. When the entity enrolls, the sponsoring institution processes payments as the funding entity server 180. The funding entity server 180 sets up a funding entity account to share in transactions for the sponsored user 120 enrolled in the behavior detection program. The funding entity server 180 can be configured with a rules database 224 comprising rules or criteria for processing the payments of an intoxicated user 120. For example, the funding entity server 180 can set a limit on the number of times the funding entity subsidizes a user's transactions when intoxicated, set a share percentage of transactions, or set categories for merchants or services subsidized (e.g. rideshare, public transportation, Uber™, Lyft™), or time windows when subsidization is available (e.g. 4:00 PM-4:00 AM, Friday and Saturday).

In at least one embodiment, behavior detection server 125, issuer server 160, merchant server 130, funding entity server 180, and acquirer server 140 can include one or more third-party and/or external content provider services (not shown). Behavior detection server 125 can include, integration with, for example, social network platforms, media distribution platforms, or the like. In an embodiment, behavior detection server 125, payment card network server 150, issuer server 160, merchant server 130, acquirer server 140, funding entity server 180, and client user device 101 can be arranged to integrate and/or communicate using API's or other communication interfaces, for example by offering a HTTP/REST based interface.

One of ordinary skill in the art will appreciate that the architecture of systems as described herein are a non-limiting example that is illustrative of at least a portion of at least one of the various embodiments. As such, more or less components can be employed and/or arranged differently without departing from the scope of the innovations described herein. However, descriptions are sufficient for disclosing at least the innovations claimed herein.

The operation of certain aspects will now be described with respect to FIGS. 3-6. In at least one of various embodiments, processes 300, 400, 500, and 600 described in conjunction with FIGS. 3-6, respectively, may be implemented by and/or executed on one or more network computers. In other embodiments, these processes or portions of these processes may be implemented by and/or executed on a plurality of network computers. Likewise, in at least one of the various embodiments, processes 300, 400, 500, and 600 or portions thereof, may be operative on one or more client computers, such as user device 101. However, embodiments are not so limited, and various combinations of network computers, client computers, virtual machines, or the like may be utilized. Further, in at least one of the various embodiments, the processes described in conjunction with FIGS. 3-6 can be operative in system with logical architectures such as those described in conjunction with FIGS. 1A-2B.

Figure 3:
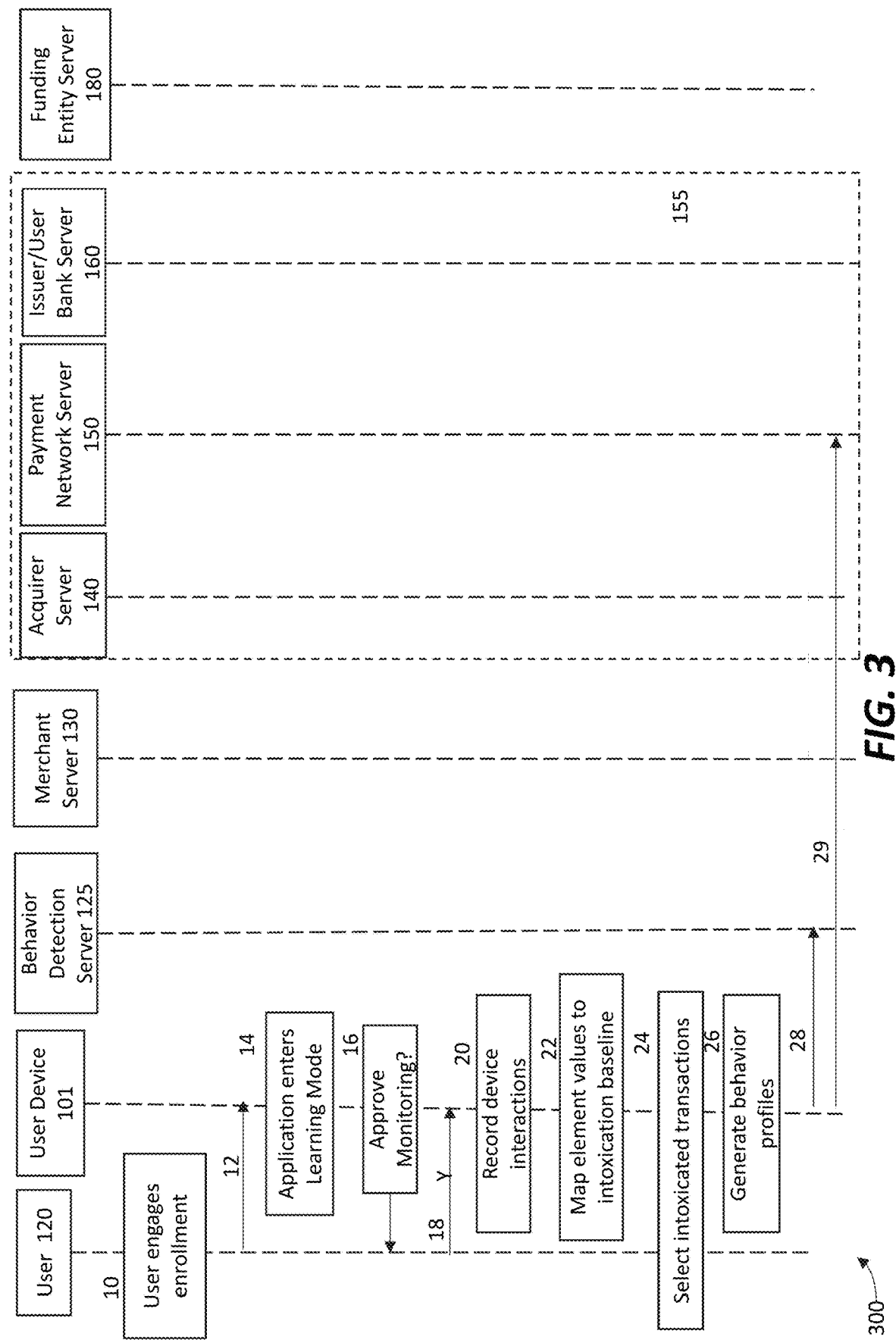
FIG. 3 illustrates an overview flowchart for a process for generating a behavior detection profile a user device application configured to detect user intoxication.
Figure 7:
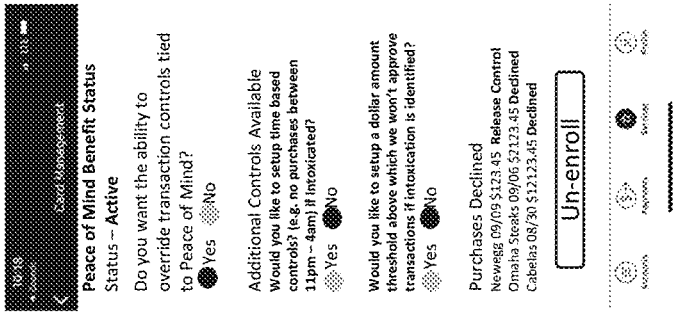
FIG. 7 represents graphical user interfaces for a behavior detection application in accord with an embodiment.
Figure 7:
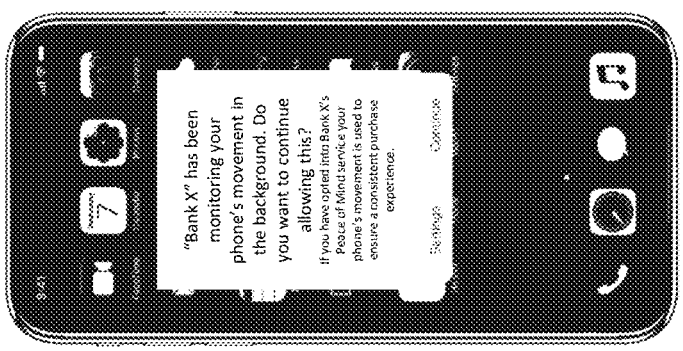
Figure 7:
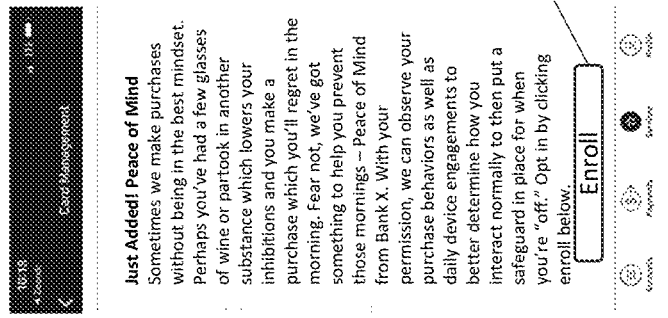

FIG. 3 illustrates an overview flowchart for a process 300 for detecting intoxicated user from the user's interaction with a user device when processing a payment transaction in accordance with an embodiment. At block 10 the user 120 engages an enrollment interface 85 for a behavior detection platform and downloads a behavior detection application 220 on the user device 101. An exemplary enrollment interface 85 for a behavior detection application 220 is shown in FIG. 7. In an embodiment, the behavior detection application 220 can be implemented as an application in a payment application 230 for managing payment cards and payment card transactions, for example as shown with respect to FIG. 1B. At block 12, the user enrolls to the behavior detection platform via the behavior detection application 220 on the user device 101. At block 14, the behavior detection application 220 enters into a learning state. In the learning state, at block 16, the behavior application 220 informs the user 120 that the behavior detection application is monitoring the user's movements and requests the user approve user device 101 hardware permissions to continue monitoring the user's movements via the user device 101 inputs and hardware sensors as described herein. The user 120 can be prompted to select the inputs the behavior detection application 220 is permissioned to monitor to assess intoxication. An exemplary permissions interface 90 for a behavior detection application 220 is shown in FIG. 7.

At block 18 the user approves the monitoring, and at block 20, the user device 101 starts or continues to monitor the user's 120 interactions with the user device 101, such as the user's motion (e.g. via accelerometers, gyroscope, compass and so on), application level data and endpoint device input as described herein. At block 22, behavior detection application maps user 120 interactions with the user device 101 to behavior element values to determine a baseline for detecting when the user is sober and deviating behavior element values for when the user is intoxicated as described herein. At block 24, the behavior detection application 220 is configured to have the user select transactions made while intoxicated. For example, the behavior detection application 220 can be configured to prompt a user 120 at given times or time intervals to select transactions that were made while intoxicated. The behavior detection application 220 can also be configured with an interface to select transactions made while intoxicated. The behavior detection application 220 can also be configured to prompt or allow the user to identify themselves as intoxicated, for example, while engaging in a transaction. Accordingly, the behavior detection application 220 can be configured to allow a user to identify when they are intoxicated, which can speed up the process for generating a behavior profile 235.

The behavior detection application 220 remains in the learning state until the behavior detection application 220 has ingested sufficient sensor and input data to identify sober and intoxicated baselines for behavior values elements.

At block 26, the behavior detection application 220 then generates and stores behavior profiles 235 for the user 120. At block 28, the behavior detection application 220 can also be configured to send a notification to the behavior detection server 125 indicating behavior profiles 235 for the user have been generated. The behavior detection server 125 can then save the information in a user profile database 239. At block 29 the payment card information for the user 120 is also updated at payment network server 150 in a payment card holder database 317 to identify the user 120 is enrolled for behavior detection monitoring and transaction controls.

Figure 4:
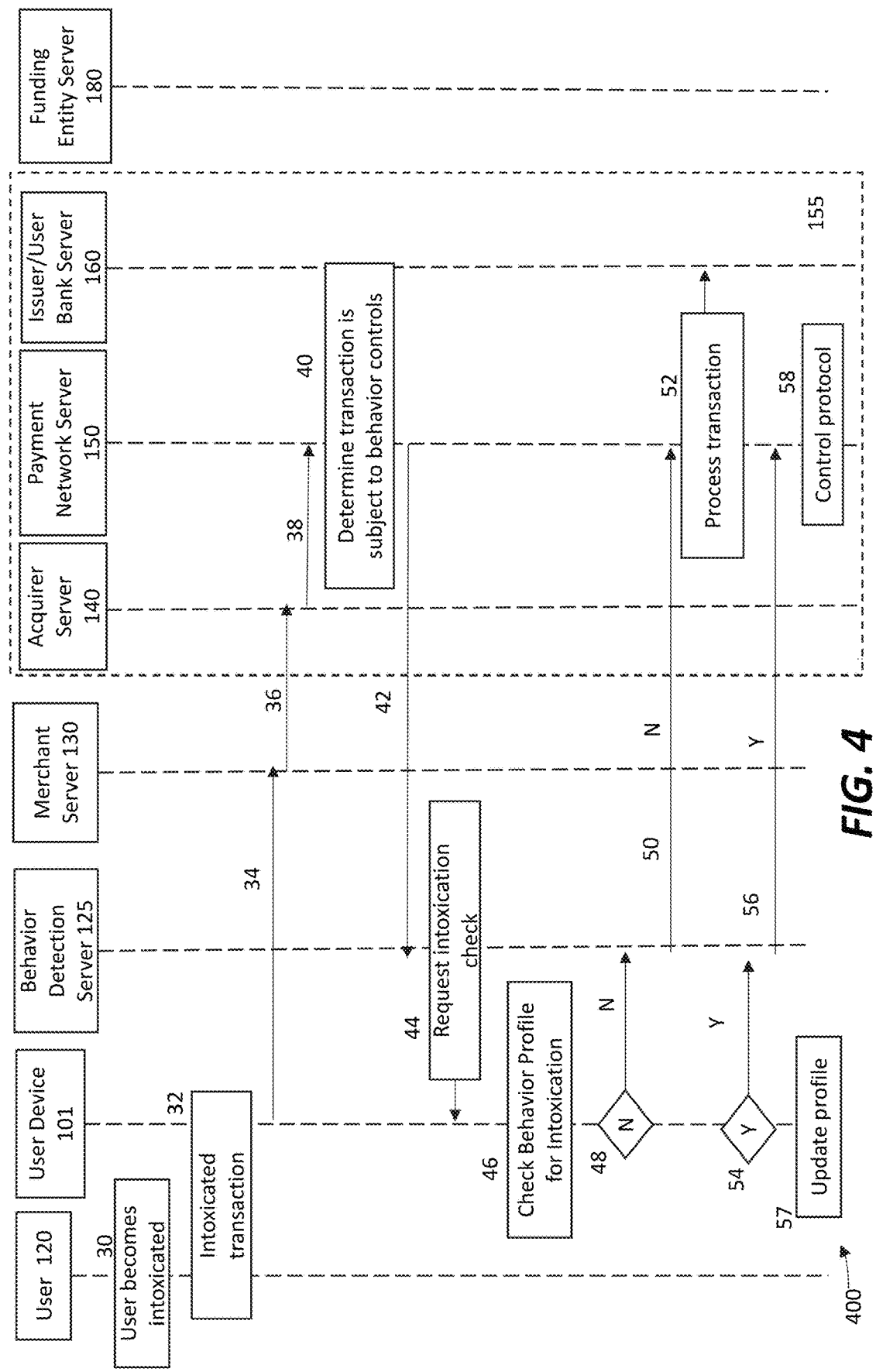
FIG. 4 shows a system flow for processing a payment transaction in conjunction with behavior detection in accord with an embodiment.

In an embodiment, FIG. 4 shows a system flow for processing a payment transaction in conjunction with behavior detection. At block 30, a user enters an intoxicated state. At block 32, the user engages a purchase transaction via a merchant POS device or online transaction via user device 101 with a merchant, service, or content server 130 while intoxicated. An example given herein is for a ridesharing or other transportation transaction, for example, via a taxi, Uber™ Lyft™ or public transport (e.g. bus, train). However, as will be appreciated, as described herein, the system can be configured to identify when the user is intoxicated for any transaction.

At block 34, block 36, and block 38 the transaction is processed from the merchant server 130 to the acquirer server 140 and then to the payment network server 150 for transaction processing as described herein. At block 40, the payment network server 150 determines the transaction for the user 120 is subject to behavior controls, for example, by accessing the payment cardholder database 317 to determine if the user has enrolled in behavior detection. At block 42 the payment network server transmits a behavior profile check for the user to the behavior detection server 125. At block 44 the behavior detection server 125 transmits a request to the behavior detection application 220 at the user device 101 to report if the user is intoxicated or sober. At block 46, the behavior detection application 220 checks the behavior profiles 235 to determine if the user 120 meets a sober profile or an intoxicated profile. If the user meets the sober profile and is not intoxicated, at block 48 the behavior detection application sends a negative intoxicated message (N) to the behavior detection server 125. At block 56, the behavior detection application 220 can also be configured to update the behavior profiles 235 to indicate the transaction was made while sober. The user profile of the user profiles database 239 of the behavior detection server 125 can also be updated. At block 50, the behavior detection server 125 relays the negative intoxicated message (N) to the payment network server 150. At block 52, the payment network server then processes the transaction as normal and sends the transaction to the issuer server 160 for approval.

If the behavior detection application 220 determines the user meets the intoxicated profile and is intoxicated, at block 54 the behavior detection application sends a positive intoxicated message (Y) to the behavior detection server 125. At block 56, the behavior detection server 125 relays the positive intoxicated message (Y) to the payment network server 150. At block 57, the behavior detection application 220 can also be configured to update the behavior profiles 235 to indicate the transaction was made while intoxicated. The user profile of the user profiles database 239 of the behavior detection server 125 can also be updated. When the payment card network server 150 receives confirmation that the behavior detection application 220 has determined the user activity meets the intoxicated profile, at block 58 the payment card network server implements a control protocol for the transaction.

Figure 5:
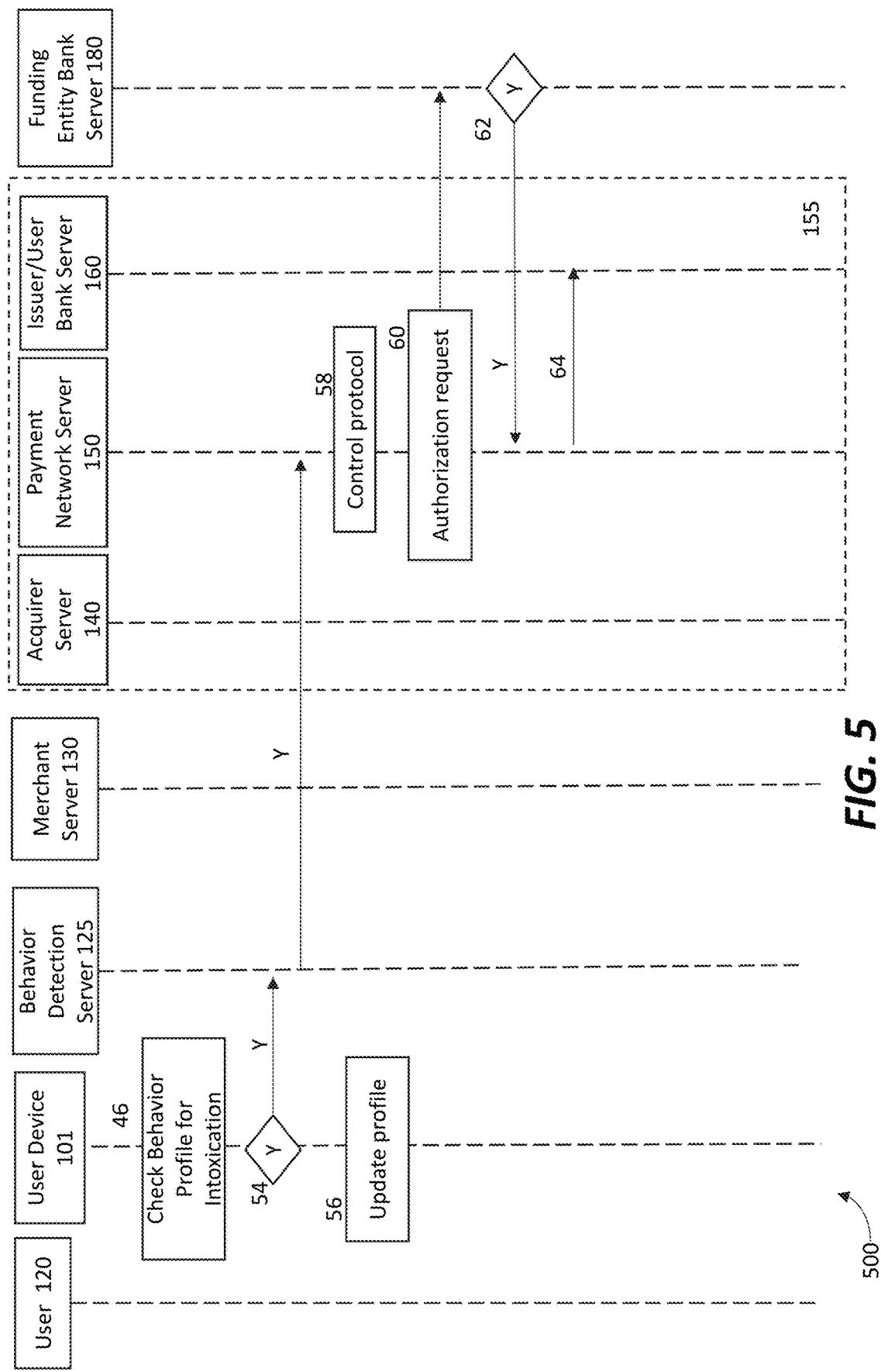
FIG. 5 shows an embodiment of a control protocol for a transaction made when the behavior detection application determines a user meets an intoxicated profile and is intoxicated.

FIG. 5 shows an embodiment of a control protocol for a transaction made when the behavior detection application 220 determines the user meets the intoxicated profile and is intoxicated. In an embodiment, a funding entity can be responsible for paying a portion of a transaction that is identified as made while intoxicated. In the example given herein, a funding entity agrees to cover some or all transportation transactions (e.g., ride share, taxi, or public transport) for a user 120 when the behavior detection application 220 identifies the user as intoxicated. At block 60, the payment network server sends a transaction authorization request to the funding entity server 180 to authorize payment of some or all of the transaction from a sponsor funding entity account. At block 62, the funding entity server 180 authorizes the transaction to the payment card network server 150. At block 64, the payment card server 150 then sends the transaction to the issuer server 150 for the remaining share, if any, of the payment for the transaction.

Per the example of a transportation or ride share, the system can be configured to allow a sponsoring funding entity to provide an incentive not to drive when intoxicated. For example, a family member or friend, or an institution or entity can agree to pay for some or all of a user's transportation purchase, in which case the funding entity server 180 can be integrated into the payment card network 155 to pay a share of the transaction as described above with respect to FIG. 1B.

In another example, the system can be configured to allow a funding entity to sponsor a "designated driver" by sharing some or all of the payment of non-alcoholic beverages. The behavior detection application 220 can be configured to allow a user to select a "designated driver" for a group of users for a given time window. The behavior detection application can be configured to check if the user meets a sober profile for the user during the time window. If so, the funding entity can share in the payment of the non-alcoholic beverage transaction.

Figure 6:
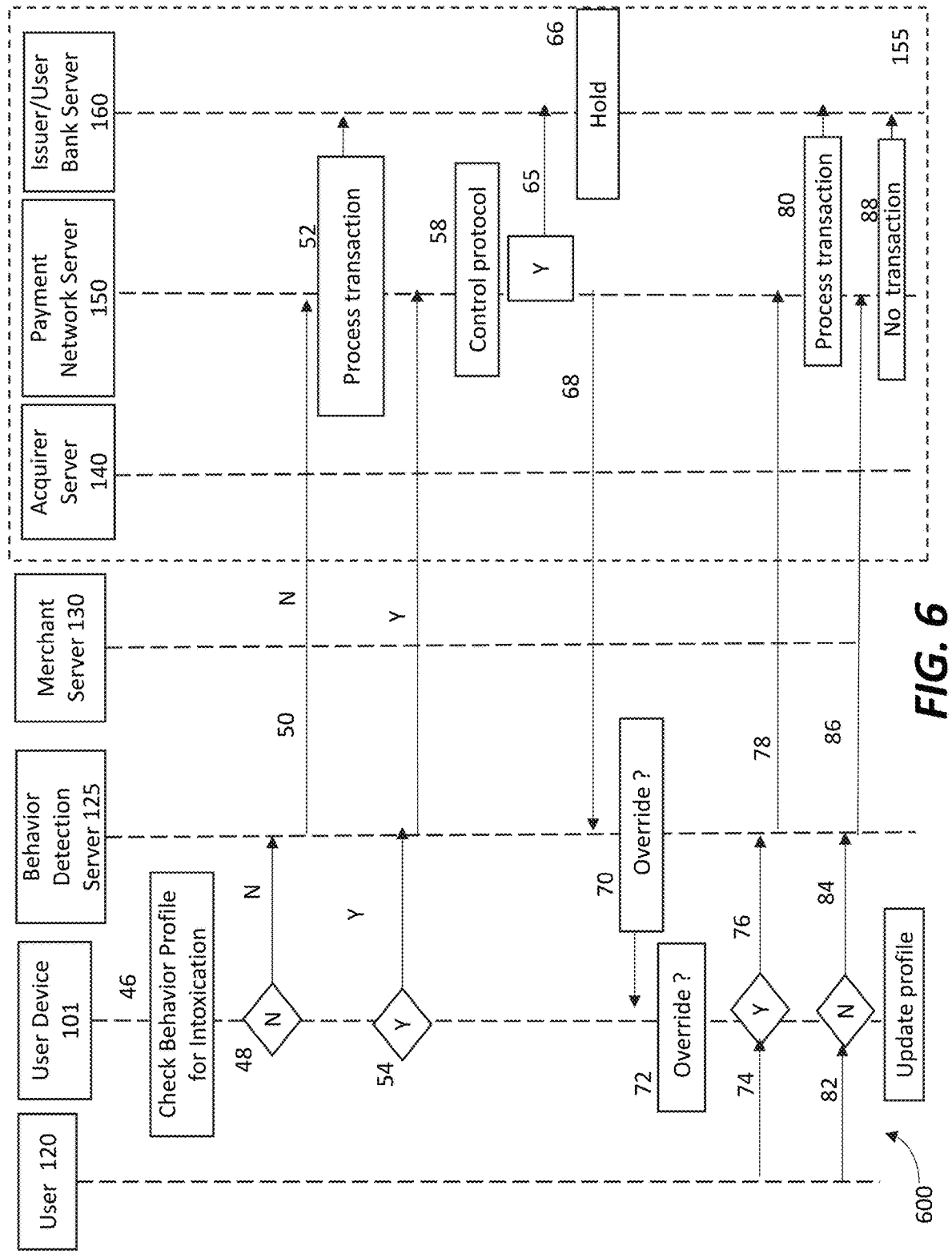
FIG. 6 shows an embodiment of a control protocol for a transaction made when the behavior detection application determines a user meets an intoxicated profile and is intoxicated.

FIG. 6 shows another embodiment of a control protocol for a transaction made when the behavior detection application 220 determines the user meets the intoxicated profile and is intoxicated. In an embodiment, the system can be configured to interrupt a transaction that is identified as made while intoxicated. For example, referring to FIG. 4, at block 32, the user engages a purchase transaction with a merchant, service, or content server 130 while intoxicated. For example, while under the influence, a customer goes to Cabela's and tries to purchase a boat for $12,000. The transaction proceeds as described with respect to FIG. 4 to the control protocol of block 58. As shown in FIG. 6, at block 65, the payment network server 150 transmits a notification to the issuer server 160 that the behavior detection application 220 has identified the user as intoxicated. At block 66, the issuer server 160 places a hold on the transaction approval. At block 68, the payment network server 150 transmits an approval request for the transaction to the behavior detection server 125.

At block 70, the behavior detection server 125 transmits a query to the behavior detection application 220 asking if the user wants to override the behavior control protocol and authorize the transaction. An exemplary control interface 90 for setting or administering override capability is shown in FIG. 7. In an embodiment, the control interface 90 can be configured to allow the user to set a threshold amount for which an override is not required when the behavior detection application 220 determines the user is intoxicated. At block 74, the user can input an override (Y) to the user device 101 to authorize the transaction. In an embodiment, the control interface can be configured to give the user the ability to override transaction controls via the control interface 90 or via an SMS message. If the user overrides, at block 76 the user device transmits the authorization to the behavior detection server 125. At block 78, the behavior detection server 125 transmits an authorization message to the payment network server 150. At block 80, the payment card server 150 then sends the transaction to the issuer server 150 for approval of payment for the transaction.

At block 82, the user can choose not to override (N) the control protocol on the user device 101 to authorize the transaction. At block 84, when the user does not override the control protocol, the user device 101 transmits the non-approval (N) to the behavior detection server 125. At block 86, the behavior detection server 125 transmits the non-approval (N) message to the payment network server 150. At block 88, the payment card server 150 can transmit a message to the issuer server 160 that the payment is not authorized, and the transaction does not execute. In the alternative, if the user does not input any response to the override request on the user device 101 at block 72, the hold established at block 66 expires after a predetermined time period and the transaction does not execute.

Per the example of purchasing a $12,000 boat, the user 120 has been notified (1) that the behavior detection application 220 has, based on the interactions with the user device 101, determined the user is sufficiently under the influence and (2) been given the opportunity to rethink the large purchase. Whether or not the user 120 decides to go through with the purchase, the behavior detection platform has provided a level of purchase protection to prevent thoughtless purchases while intoxicated. Further, in the embodiment, the system default when the user is intoxicated is to hold and prevent transactions unless the user 120 authorizes them. Thus, the platform effectively turns merchants into checks on the intoxicated user 120.

It will be understood that each block of the flowchart illustration, and combinations of blocks in the flowchart illustration, can be implemented by computer program instructions. These program instructions can be provided to a processor to produce a machine, such that the instructions, which execute on the processor, create means for implementing the actions specified in the flowchart block or blocks. The computer program instructions can be executed by a processor to cause a series of operational steps to be performed by the processor to produce a computer-implemented process such that the instructions, which execute on the processor to provide steps for implementing the actions specified in the flowchart block or blocks. The computer program instructions can also cause at least some of the operational steps shown in the blocks of the flowchart to be performed in parallel. Moreover, some of the steps can also be performed across more than one processor, such as might arise in a multi-processor computer system or even a group of multiple computer systems. In addition, one or more blocks or combinations of blocks in the flowchart illustration can also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

FIG. 7 represents graphical user interfaces for a behavior detection application 220 in accord with at least one of the various embodiments.

In an embodiment, an exemplary enrollment interface 85 for a behavior detection application 220 is shown. The enrollment interface 85 includes an "Enroll" button 86 that activates a pop up window asking a user 120 to approve terms and conditions that shows all requested data points for usage by the behavior detection application 220.

In an embodiment, an exemplary permissions interface 90 for a behavior detection application 220 is shown. The permissions interface 90 includes controls that allow the user to control permissions for the behavior detection application's 220 access to the hardware, application level data, an endpoint interaction data from the user device 101.

In an embodiment, an exemplary control interface 95 for setting or administering override capability is shown. The control interface 95 can be configured to allow the user 120 to set a threshold amount for which an override is not required when the behavior detection application 220 determines the user is intoxicated. In the embodiment, the control interface 90 can be configured to give the user 120 the ability to override transaction controls via the control interface 90 or via an SMS message.

In at least one of the various embodiments, user interfaces other than user interfaces 85, 90, or 95 can be employed without departing from the spirit and/or scope of the claimed subject matter. Such user interfaces can have more or fewer user interface elements which can be arranged in various ways. In at least one of the various embodiments, servers such as issuer server 160, funding entity server 180, acquirer server 140, merchant server 130 or behavior application server 175, can include processes and/or API's for generating user interfaces, including user interfaces 85, 90, or 95.

The terms "comprises" or "comprising" are to be interpreted as specifying the presence of the stated features, integers, steps or components, but not precluding the presence of one or more other features, integers, steps or components or groups thereof.

Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it can be based on one or more other things as well. In other words, unless expressly indicated otherwise, as used herein "based on" means "based at least in part on" or "based at least partially on."

The techniques described herein are exemplary and should not be construed as implying any particular limitation on the present disclosure. It should be understood that various alternatives, combinations and modifications could be devised by those skilled in the art from the present disclosure. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A method for payment transaction processing in conjunction with behavior detection, the method comprising:
    placing a behavior detection application on a user device into a learning state;
    monitoring a user's interactions with the user device with the behavior detection application while the behavior detection application is in the learning state to generate endpoint data, the endpoint data including at least data from the user's physical interactions with the input hardware and software, including timing and location of touch events or timing between keystrokes, or both;
    mapping the endpoint data from the user's interactions with the user device to behavior element values, including the timing and location of the touch events or the timing between keystrokes or both, to enable a behavior detection model to establish a baseline for when the user is sober;
    identifying behavior element values, including the timing and location of the touch events or the timing between keystrokes or both with the input hardware and software, that deviate from the baseline to enable the behavior detection model to establish a baseline for when the user is intoxicated, wherein the behavior detection application remains in the learning state until the behavior detection application can identify the sober baseline and the intoxicated baseline for the behavior element values;
    generating a behavior profile for the user based on the endpoint data from the user's interactions with the user device, the behavior profile including a sober profile and an intoxicated profile;
    receiving, at a payment network server, a payment card transaction for the user;
    determining if a user's activity interacting with the user device during the payment card transaction meets either the intoxicated profile or the sober profile; and
    implementing a transaction control protocol for the transaction if the behavior detection application determines the user activity meets the intoxicated profile or the sober profile.

2. The method of claim 1 further comprising:
    offering the user device an enrollment interface for a behavior detection platform; and
    downloading the behavior detection application to the user device.

3. The method of claim 1, further comprising:
    monitoring the user's interactions with the user device with the behavior detection application: to generate application level data, and motion detection data from the user device's motion detection sensors.

4. The method of claim 3 wherein the motion detection sensors are selected from the group consisting of: a compass, a gyroscope, and an accelerometer.

5. The method of claim 1 wherein generating the behavior profile further comprises at least one of:
    offering an interface to allow the user to select one or more payment card transactions when the user is intoxicated; and
    offering an interface to allow the user to identify themselves as intoxicated.

6. The method of claim 1 further comprising:
    obtaining permissions and configuring the user device to allow the behavior detection application to monitor the user's interactions with the user device.

7. The method of claim 1 further comprising:
    generating a notification for the user device that the behavior detection application is in the learning state; and
    generating a notification that the behavior profile is active.

8. The method of claim 7 further comprising:
    transmitting the notification to the behavior detection server; and
    saving the user's behavior profile in a user profile database of the behavior detection server.

9. The method of claim 1 further comprising:
    determining, at the payment network server, that the transaction is subject to behavior controls if the behavior detection application determines the user activity meets the intoxicated profile or the sober profile;
    transmitting, from the payment network server, a behavior profile check to the behavior detection server;
    transmitting, from the behavior detection server to the behavior detection application at the user device, a behavior profile check request to report if the user is intoxicated or sober;
    determining, by the behavior detection application, if the user interaction data meets the sober profile or the intoxicated profile of the user's behavior profile; and
    transmitting, by the behavior detection application, a response to the behavior detection server based on the behavior profile.

10. The method of claim 9 further comprising:
    updating the behavior profile to indicate that the transaction is being made based on the sober profile or the intoxicated profile.

11. The method of claim 1 wherein the control protocol for the transaction comprises:
    transmitting an authorization request to a funding entity server to authorize a payment of the transaction from a sponsor funding entity account.

12. The method of claim 1 wherein the funding entity server is configured to authorize the payment and a payment amount based on a transaction payment criterion selected from the group consisting of: a number of transactions; a transaction time; a payment share, and a merchant category.

13. The method of claim 1 wherein the transaction is for a transportation service.

14. The method of claim 1 wherein the control protocol for the transaction comprises denying a transaction if the behavior detection application determines the user meets the intoxicated profile.

15. The method of claim 14 wherein the control protocol for denying the transaction comprises:
    transmitting a notification from the payment network server to an issuer server that the behavior detection application has identified the user as intoxicated;
    placing a hold on the transaction approval;
    transmitting an approval request for the transaction to the behavior detection server;
    transmitting a query from the behavior detection server to the behavior detection application asking if the user wants to authorize the transaction;
    authorizing the transaction only when the user inputs an authorization for the transaction; and
    canceling the transaction if the user does not authorize the transaction.

16. The method of claim 14 wherein the control protocol criterion for denying the transaction is selected from a group consisting of: a threshold payment amount, a transaction time, a transaction type, and a merchant category.

17. The method of claim 1, further comprising:
receiving, at the behavior detection server, a dataset of intoxicated profiles and sober profiles; and
employing machine learning to output a machine learning generated behavior detection model based on the dataset for a feature set of the behavior detection model from the intoxicated profiles and sober profiles.

18. The method of claim 1, wherein the endpoint data including at least data from the user's physical interactions with the input hardware and software further comprises one or more of:
length of text field inputs;
modifier key details;
window scroll events;
mouse move events; and
mouse click events.

19. A system comprising:
a behavior detection server comprising a processor and operatively connected to a user device;
the user device comprising a behavior detection application being configured to at least:
place the behavior detection application on the user device into a learning state;
monitor a user's physical interactions with the user device to generate endpoint data, the endpoint data including at least data from the user's physical interactions with the input hardware and software, including timing and location of the touch events or timing between keystrokes, or both; and
send the endpoint data to the behavior detection server;
the behavior detection server being configured to at least:
map the endpoint data from the user's interactions including the timing and location of the touch events of the timing between keystrokes or both, with the user device to behavior element values to establish a baseline for when the user is sober; and
identify behavior element values, including the timing and location of the touch events or the timing between the keystrokes with the input hardware and software or both, that deviate from the baseline to establish when the user is intoxicated, the behavior detection application being configured to remain in the learning state until the behavior detection application can identify the sober baseline and the intoxicated baseline for the behavior element values;
generate a behavior profile for the user based on the user's interactions with the user device, the behavior profile including a sober profile and an intoxicated profile; and
detect if the user meets the sober profile or the intoxicated profile;
a payment processing system comprising a processor configured for processing a payment card transaction, the processing comprising:
receiving a payment card transaction for the user; and
implementing a transaction control protocol for the transaction if the behavior detection application determines the user activity interacting with the user device during the payment meets the intoxicated profile or the sober profile.

20. The system of claim 19 further comprising:
the user device comprising motion detection sensors comprise sensors selected from the group consisting of a compass, a gyroscope, and an accelerometer; and
the behavior detection application being configured to monitor interactions with the user device comprising interactions selected from the group consisting of: endpoint data, application level data, and motion detection data from the user device's motion detection sensors.

21. The system of claim 19, wherein the control protocol for the transaction comprises a control protocol selected from the group of:
denying authorization of the payment card transaction; and
transmitting an authorization request to a funding entity server to authorize a payment of the transaction from a sponsor funding entity account.

* * * * *